US011266140B2

(12) United States Patent
Kroeger et al.

(10) Patent No.: US 11,266,140 B2
(45) Date of Patent: Mar. 8, 2022

(54) WEED ELECTROCUTION SYSTEM

(71) Applicant: Old School Manufacturing LLC, Sedalia, MO (US)

(72) Inventors: Michael Kroeger, LaMonte, MO (US); Benjamin Kroeger, Syracuse, MO (US); Brandon Baer, Edelstein, IL (US)

(73) Assignee: Old School Manufacturing, LLC., Sedalia, MO (US)

( * ) Notice: Subject to any disclaimer, the term of this patent is extended or adjusted under 35 U.S.C. 154(b) by 392 days.

(21) Appl. No.: 15/978,495

(22) Filed: May 14, 2018

(65) Prior Publication Data

US 2018/0325091 A1 Nov. 15, 2018

Related U.S. Application Data

(60) Provisional application No. 62/505,459, filed on May 12, 2017.

(51) Int. Cl.
*A01M 21/04* (2006.01)
*B62D 49/06* (2006.01)

(52) U.S. Cl.
CPC ......... *A01M 21/046* (2013.01); *B62D 49/065* (2013.01)

(58) Field of Classification Search
CPC .. A01M 21/046; A01M 7/0057; A01M 19/00; A01B 39/14; A01B 39/18; A01B 47/00; A01B 15/20; B62D 49/065
USPC ......................................................... 47/1.3
See application file for complete search history.

(56) References Cited

U.S. PATENT DOCUMENTS

| | | | | |
|---|---|---|---|---|
| 309,706 A | * | 12/1884 | Gale | A01B 39/14 172/313 |
| 593,235 A | * | 11/1897 | McBride | A01M 21/046 47/1.3 |
| 646,774 A | * | 4/1900 | Whipple | A01B 39/14 172/310 |
| 1,576,847 A | * | 3/1926 | Williams | A01B 39/14 D21/422 |
| 1,724,143 A | * | 8/1929 | Penland | A01B 39/18 172/310 |
| 2,060,196 A | * | 11/1936 | Goodman | A01B 15/20 172/310 |
| 2,592,654 A | * | 4/1952 | Canfield | A01M 21/046 43/132.1 |
| 2,750,712 A | * | 6/1956 | Rainey | A01M 21/046 47/1.3 |

(Continued)

FOREIGN PATENT DOCUMENTS

EP 0026248 8/1981
WO WO 2016/016627 2/2016

*Primary Examiner* — Christopher D Hutchens (57) ABSTRACT

A weed electrocution system comprises a tool bar section comprising a central tool bar and one or more peripheral tool bars pivotable relative to the central tool bar. A mount is adapted to mount the tool bar section to a tractor. A first electrode is associated with the central tool bar, and a a second electrode is associated with the second tool bar. When an electric current is supplied to the first and second electrodes, the electrodes are able to electrocute weeds that come in contact with the electrodes. A ground wheel connected to a peripheral tool bar causes the peripheral tool bar and the second electrode to adjust to the contour of the land.

20 Claims, 5 Drawing Sheets

(56) References Cited

U.S. PATENT DOCUMENTS

| | | | | |
|---|---|---|---|---|
| 3,919,806 | A | * | 11/1975 | Pluenneke .......... A01M 21/046 47/1.3 |
| 3,935,670 | A | | 2/1976 | Pluenneke et al. |
| 4,094,095 | A | | 6/1978 | Dykes |
| 4,428,150 | A | * | 1/1984 | Geiersbach ......... A01M 21/046 363/64 |
| 5,806,294 | A | | 9/1998 | Strieber |
| 6,237,278 | B1 | | 5/2001 | Persson et al. |
| 6,315,658 | B1 | * | 11/2001 | Weber .................. A01D 41/127 460/6 |
| 2006/0265946 | A1 | * | 11/2006 | Schwager ........... A01M 21/046 47/1.3 |
| 2017/0215405 | A1 | * | 8/2017 | Kent .................... A01M 21/04 |

* cited by examiner

WEED ELECTROCUTION SYSTEM

PRIORITY

The present application claims the benefit of domestic priority based on U.S. Provisional Patent Application 62/505,459 filed on May 12, 2017, the entirety of which is incorporated herein by reference.

BACKGROUND

A common part of a commercial farming operation is the attempt to control the growth of unwanted vegetation, or weeds. Weeds can overgrow a commercial crop and inhibit the nutrient uptake and growth of the desired crop. "Sweet flowers are slow and weeds make haste," (Shakespeare, Richard III: Act 2, Scene 4) and it is thus the vigilant farmer's obsession to control the growth of weeds.

A conventional method of treating crop fields for weeds is with the use of herbicides that include one or more chemicals that eradicate one or more weeds. However, the chemicals may also be toxic and harmful for humans and different animal species. More particularly, conventional herbicides can cause various health problems such as skin and respiratory issues. There are also concerns over carcinogenicity as well as a potential relationship with other diseases. Another drawback to the use of herbicides is that they are not always successful in killing the target weeds in the crop fields. Weeds have the ability to mutate, and different species of weeds have developed resistance to herbicides due to residuals remaining in the soils. Additionally, herbicides can be washed off plants if a rain follows their application or blown away due to wind thereby restricting the times of application and potential effectiveness of the treatment with a herbicide while potentially carrying the herbicide to undesired locations.

In the agricultural industry, there is increasing pressures to reduce the amount of herbicides, pesticides, and other toxic products applied to crops. This need is especially increasing with the push for more organically grown crops that do not use traditional herbicides and pesticides to treat the crops. By reducing the amount of toxic chemicals applied to crops there is less runoff of these chemicals to harm humans and other animal life.

In an effort to control weeds without the need for herbicides, many farmers have turned to less conventional methods of weed eradication, but these unconventional methods have been fraught with problems of their own. For example, electromechanical equipment has been used to treat agriculture crops for weeds by electric discharge. However, existing equipment has yet to be sufficiently effective and useful. The equipment has heretofore been restricted to small fields. Previously developed equipment has failed to provide an efficient, effective, and safe manner for applying a current to the target weeds in a crop field. For example, prior attempts have used rigid electrodes that do not contour with the ground. As a result, weeds can be tamped down and/or not adequately treated. In addition, desired crops are often unintentionally treated, especially when the grade of the land changes.

Therefore, there exists a need for an improved system for treating weeds using electricity. In addition, there is a need for a system for electrocuting weeds that adjusts to the contour of the land. There is a further need for a system for electrocuting weeds that provides added safety for an operator. There is still a further need for a system for electrocuting weeds that is more advantageously positionable and maneuverable.

SUMMARY

The present invention satisfies these needs. In one aspect of the invention, a weed electrocution system is mountable on a tractor and is able to adjust to the contour of the land.

In another aspect of the invention, a weed electrocution system includes safety features that protect an operator during use of the system.

In another aspect of the invention, a weed electrocution system includes a system for advantageously positioning electrodes and/or maneuvering the system through a crop field.

In another aspect of the invention, a weed electrocution system comprises a tool bar section comprising a first tool bar and a second tool bar, the second tool bar being moveable relative to the first tool bar; a ground wheel connected to the second tool bar; a mount adapted to mount the first tool bar to a tractor; a first electrode associated with the first tool bar; and a second electrode associated with the second tool bar, wherein when an electric current is supplied to the first and second electrodes, the electrodes are able to electrocute weeds that come in contact with the electrodes, and wherein the ground wheel causes the second tool bar and second electrode to move relative to the first tool bar and first electrode to adjust to the contour of the land.

In another aspect of the invention, a weed electrocution system comprises a tool bar; a mount adapted to mount the tool bar to a tractor; an electrode bar; an electrode holding arm connected to the tool bar, the electrode holding arm comprising electrically insulating material; and an electrical insulator connecting the electrode bar to the electrode holding arm, wherein when an electric current is supplied to the electrode bar, the electrode bar is able to electrocute weeds that come in contact with the electrode bar, and wherein the electrical insulator and the electrode holding arm prevent current from passing from the electrode bar to the tool bar.

In another aspect of the invention, a method of electrocuting weeds comprises mounting a tool bar section to the front of a tractor, the tool bar section comprising a first tool bar and a second tool bar, the second tool bar being moveable relative to the first tool bar; supporting the second tool bar by a ground wheel; supplying electrical current to a first electrode associated with the first tool bar and to a second electrode associated with the second tool bar; and driving the tractor through a crop field and contacting weeds with the first and second electrodes to electrocute the weeds, wherein the ground wheel causes the second tool bar and second electrode to move relative to the first tool bar and first electrode to adjust to the contour of the land in the crop field.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

DESCRIPTION

The present invention relates to the control of unwanted vegetation growth, or weeds. In particular, the invention relates to the electrocution of weeds in an agricultural field. Although the invention is illustrated and described in the context of being useful for controlling weed growth by application of electric current, the present invention can be used in other ways, as would be readily apparent to those of ordinary skill in the art. Accordingly, the present invention should not be limited just to the examples and embodiments described herein.

Figure 1A:
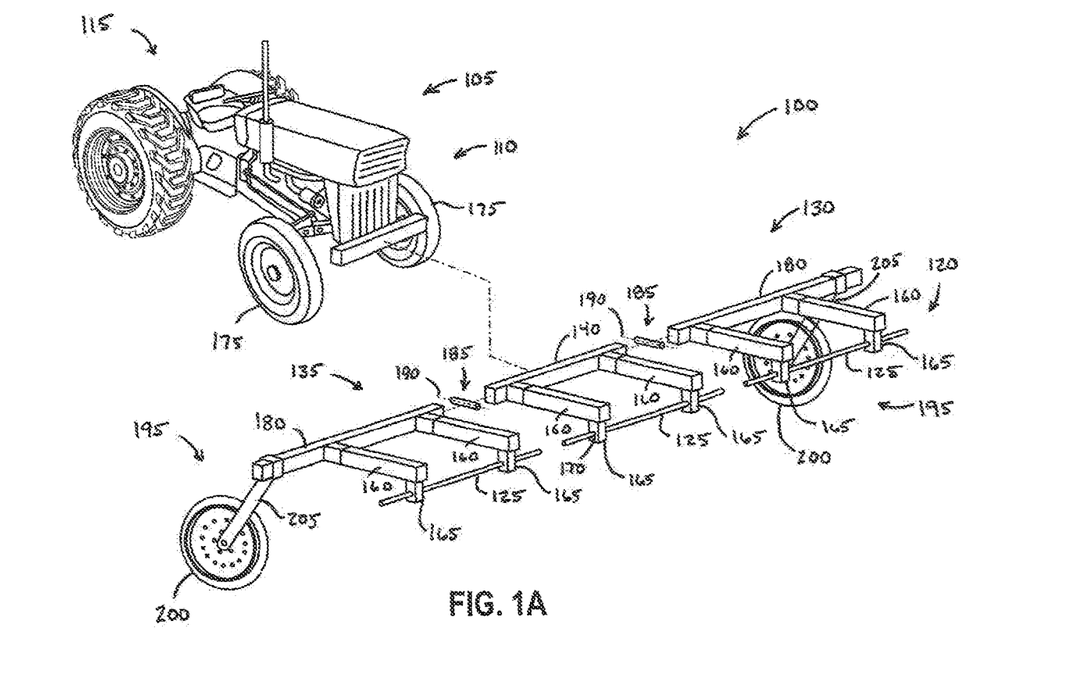
FIG. 1A is a schematic, exploded, perspective view of a weed electrocution system according to one version of the invention.

FIG. 1A shows a weed electrocution system 100 in accordance with one version of the invention. The weed electrocution system 100 can be attached to a tractor 105 and transported through a crop field to control the growth of weeds in the crop field. By "weed" it is meant any undesired vegetation, even if the undesired vegetation itself has commercial or farming value. By "tractor" it is meant any vehicle capable of being driven through a crop field. Often the weed electrocution system 100 will be used to control various different types of weeds in the crop field. The challenge is the selective eradication by electrocution of weeds while not harming the desired crop. The weed electrocution system 100 may be attached to the front end 110 of the tractor 105 so that it may be pushed through the crop field, as will be described. Alternatively, the weed electrocution system 100 may be attached to the rear end 115 of the tractor 105 so that it may be pulled through the crop field. In the illustrated version, the weed electrocution system 100 is attached to the front end 110. With this version, the operator of the tractor 105 is more easily able to watch the electrocution process while safely operating the tractor 105 and can make any necessary adjustments such as the adjustment of the height of the system. The operator also has a clear-view vantage point making it easier to see obstacles and/or people or animals that need to be avoided. In addition, by having the weed electrocution system 100 in front of the tractor 105, the weed electrocution system 100 can be the first component to contact the weeds rather than being run over first by the tractor 105 and tamped down if the system was being towed. Additionally, the front mount provides improved maneuverability in that it eliminates the tail-swing factor associated with a rear mount design.

The weed electrocution system 100 operates by applying a lethal electric current to weeds as the weed electrocution system 100 passes over the weeds in a crop field. The weed electrocution system 100 includes one or more electrodes 120 that are designed and positioned to deliver the electricity to the weeds. In the version of FIG. 1A, the electrodes 120 are in the form of one or more electrode bars 125 in the form of hollow rods or the like made from a conductive material such as copper, copper alloy, or the like, that can carry and discharge electrical current. The electrode bars 125 are positioned at a height above the ground where they can come in contact with the weeds. In one version, such as the one shown in FIG. 1A, the electrode bars 125 extend generally parallel to the slope of the ground beneath the electrode bars 125 and generally orthogonal to the direction of travel of the tractor 105. This allows the electrode bars 125 to extend across a row or a plurality of rows of crops. An electrical power supply energizes the electrode bars 125 so that when the electrode bars 125 come into contact with a weed, current passes into and through the weed. A high voltage is discharged through the stem of the weed causing the moisture in the weed to boil and explode the cells in the plant. When sufficiently strong, the current not only kills the weed above the ground, but the current can travel to and kill the roots. By positioning the electrode bars 125 so that they contact the weeds and not the desired crop, the desired crop is unharmed by the process and remains in the field where it can thrive. The dead weeds can be left in the field where they will decay and contribute to the natural organic composting process.

Figure 1B:
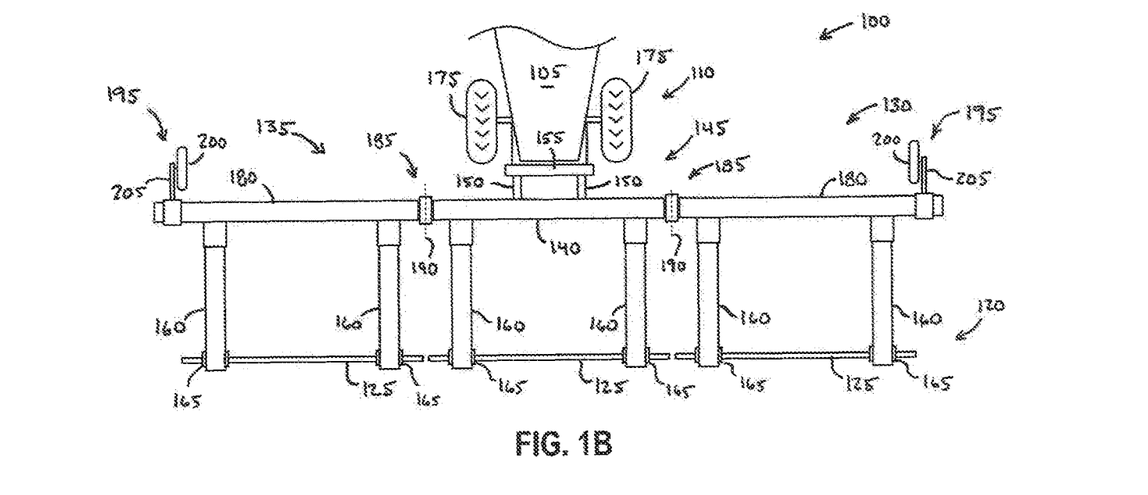
FIG. 1B is a schematic assembled top view of the weed electrocution system of FIG. 1A.

The delivery and positioning of the electrodes 120 is accomplished by a transport assembly 130, as shown in FIG. 1A and in the top view of FIG. 1B. The transport assembly 130 of the weed electrocution system 100 includes a tool bar section 135 made up of one or more tool bars that extend transverse and/or orthogonal to the direction of travel of the tractor 105 and generally parallel to the electrode bars 125. By "transverse" it is meant not parallel. By "orthogonal" it is meant substantially at a right angle, such as within about 10%. The tool bar section 135 includes a central tool bar 140 that may be rigidly connected to the front end 110 of the tractor 105 by a front-end mounting system 145. In the version shown in FIGS. 1A and 1B, the front-end mounting system is configured to mount the tool bar section 135 is a position that is generally transverse or orthogonal to the direction of travel of the tractor 105 and/or parallel to the wheel axles of the tractor 105. The front-end mounting system 145 may include one or more links 150 connected to a front mounting plate 155 on the tractor 105. The front-end mounting system is not shown in FIG. 1A for simplicity and to illustrate that a different type of mounting system can be utilized.

Extending forwardly from the central tool bar 140 is one or more electrode holding arms 160. The electrode holding arms 160 may be connected to the central tool bar 140 by any conventional method, such as clamps, bolts, welds, or the like. At the forward end of the electrode holding arms 160, an electrode bar 125 is attached. The electrode bar 125 may be attached directly to the electrode holding arms 160 or may be attached to an insulator 165 that is attached to the electrode holding arm, as shown in FIGS. 1A and 1B. The insulator 165 may be made of any non-current-conducting material sufficient to provide the strength and distance required to meet the load and specification of the system. In one version, the insulator 165 is made of shatter-resistant, high impact plastic insulators. The insulator 165 includes a passageway 170 through which the electrode bar 125 may pass. As an additional safety measure, each of the electrode holding arms 160 may serve as a second insulator. For example, at least a portion of the electrode holding arms 160 may be composed of a non-conductive material. In this version, the electrode holding arm 160 can include attachment portion 166 that serves to attach the insulating portion to the tool bar section 135. The attachment portion 166 can be a metal clamp or other type of attachment mechanism. By making the electrode holding arms 160 out of insulating material, the result is a double-insulated system which enhances safety to the operator on the tractor 105 and which reduces bleeding of electricity, even in high-moisture conditions. In an alternative version, the electrode holding arms 160 can be made of metal and be separated from the tool bar section 135 by an insulating member.

The electrode bar 125 associated with the central tool bar 140 adjusts its orientation with the contour of the land. Since the front-end mounting system 145 rigidly connects the central tool bar to the tractor 105, the angle of the electrode bar 140 relative to horizontal will be the same as the tractor front wheels 175. Thus, when the tractor 105 is on level ground, the electrode bar 125 attached to the central tool bar 140 will be on a horizontal plane. In like manner, when the tractor is on a 5 degree sideways slope, that electrode bar 125 will be tilted 5 degrees.

The weed electrocution system 100 may also be designed to extend across multiple rows of crops and/or to accommodate for ground contours that are different across the length of the tool bar section 135. In this version, the tool bar section 135 may include one or more peripheral tool bars 180 connected to the central tool bar 140. As can be seen in FIGS. 1A and 1B, each of the peripheral tool bars 180 may contain one or more forwardly extending electrode holding arms 160 that connect the peripheral tool bars 180 to a corresponding electrode bar 125. The peripheral tool bars 180 are connected to the central tool bar by a hinge mechanism 185. The hinge mechanism 185 allows the peripheral tool bar 180 to pivot relative to the central tool bar 140 about a forwardly extending axis 190. At the opposite outer end of the peripheral tool bar 180 is a ground wheel assembly 195 including a wheel 200 and a wheel connecting bar 205 that rigidly connects the wheel 200 to the peripheral tool bar 180. Thus, as the wheel 200 rolls along or otherwise contacts the ground, it changes in height as the contour of the land changes. The change in height results in a pivoting of the peripheral tool bar 180 relative to the central tool bar 140 and a subsequent adjustment of the angle of the electrode bar 125 associated with the peripheral tool bar 180. In one version, the hinge mechanism 185 allows the peripheral tool bar 180 to pivot relative to the central tool bar 140 so that the end of the peripheral tool bar 180 is displaced up or down by at least about 3 inches, more preferably at least about 6 inches, and most preferably about 9 inches. In one version, the wheel 200 is made of a conductive material and serves as an electrical grounding member for the system. In one version, the ground wheel 200 is connected to the wheel connecting bar 205 in a manner that allows the ground wheel 200 to rotate about the wheel connecting bar 205 as it rolls along the ground. In another version, the ground wheel 200 can be more rigidly attached and can be dragged along the ground. In this latter version, the ground wheel 200 need not necessarily be circular.

Figure 2A:
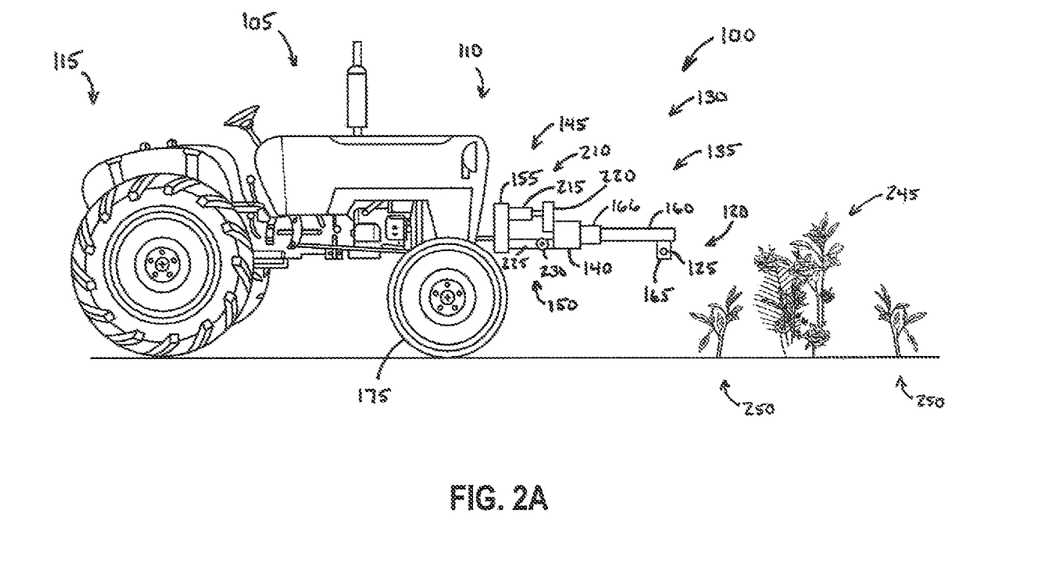
FIG. 2A is a schematic side view showing a portion of the weed electrocution system of FIGS. 1A and 1B.
Figure 2B:
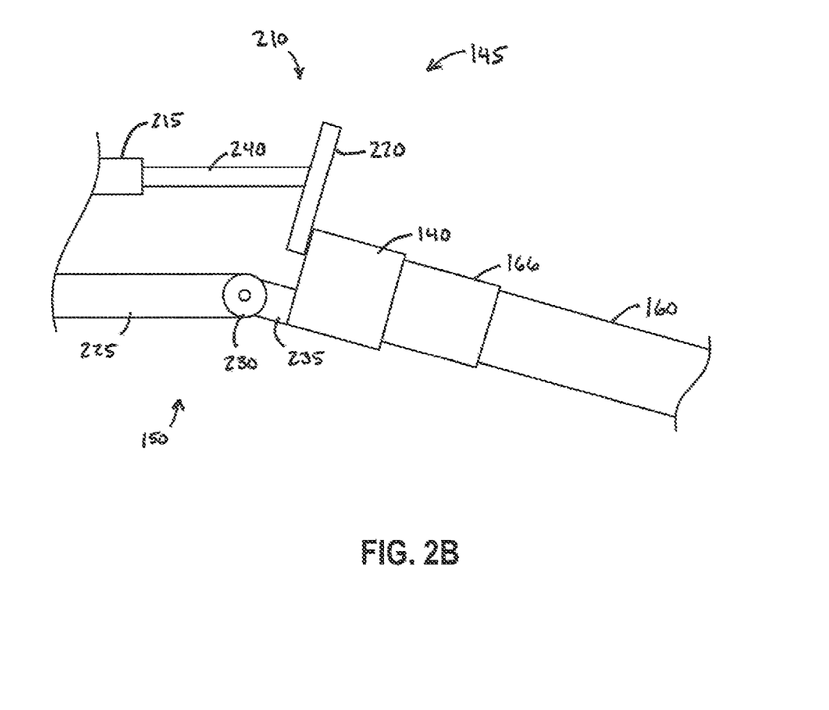
FIG. 2B is a schematic side view showing an enlarged side view of a height adjustment mechanism of the weed electrocution system of FIG. 2A.

The weed electrocution system 100 may also be equipped with a height adjustment mechanism 210, an example of which is shown in FIGS. 2A and 2B. In this version, the front-end mounting system 145 comprises the height adjustment mechanism 210. Attached to the mounting plate 155 is a hydraulic cylinder 215 that also connects to the top of the central too bar 140 by a central tool bar plate 220 rigidly attached to the central tool bar 140. The mounting plate 155 is also attached to the central tool bar 140 by one or more links 150 that are made up of a first bar 225 that is rigidly attached to the mounting plate 155, a hinge 230, and a second bar 235 that is rigidly attached to the bottom of the central tool bar 140. The hinge 230 connects the first bar 225 and the second bar 235 and allows the two to pivot relative to one another about an axis traverse or orthogonal to the forward direction. The hydraulic cylinder 215 includes a piston 240 that can be extended or retracted within the cylinder to extend or retract the length of the hydraulic cylinder 215. The hydraulic cylinder 215 is shown in a neutral position in FIG. 2A and in an extended position in FIG. 2B. As can be seen, when extended the piston 240 pushed the top of the central tool bar 140 forward which causes the second bar 235 to pivot about the hinge 230. As a result, the front of the central tool bar 140 and the electrode holding arms 160 are angled downwardly. Conversely, when the piston 240 is retracted within the hydraulic cylinder 215, the front of the central tool bar 140 is angled upward and the electrode holding arms 160 are raised. Thus, the height of the electrode bars 125 from the ground can adjusted by adjustment of the hydraulic cylinder 215. In addition, since the hinge mechanism 185 connecting the central tool bar 140 to the peripheral tool bars 180 can be designed to only allow rotation about the axis 190, the tilting of the central tool bar 140 also results in a tilting of the peripheral tool bars 180 and thus a height adjustment of all of the electrode bars 125. Only the central tool bar 140 and its associated electrode bar 125 are shown in FIG. 2A for simplicity. The piston 240 can be pivotally and/or slidingly attached to the central tool bar plate 220 to allow for the movement to occur. Alternatively, the hydraulic cylinder 215 can be replaced with another other type of adjustable length bar or with several bars of different lengths that are selectively attachable to the plates or the like. In an alternative version, the tool bar section 135 can be rigidly mounted to a front-end loader by a custom adapter mounting assembly. With this version, the hydraulic components and movement abilities of the front-end loader can be used to adjust the height of the tool bar section 135 and the electrodes 120.

As can be seen in FIG. 2A, proper selection of the height of the electrode bars 125 can result in electrocution of weeds. In the situation shown, the weeds 245 are taller than the desirable crop 250. By setting the height of the electrode bars 125 at a height between the height of the desirable crop 250 and the weeds 245, as the electrode bars 125 pass over the plants, the weeds 245 will be contacted and electrocuted while the desirable crop 245 will not be.

Figure 3A:
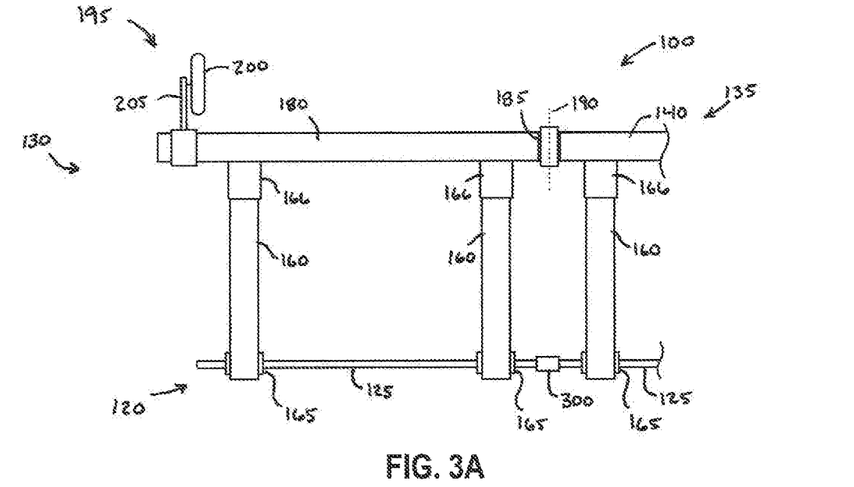
FIG. 3A is a schematic top view of another version of a weed electrocution system.
Figure 3B:
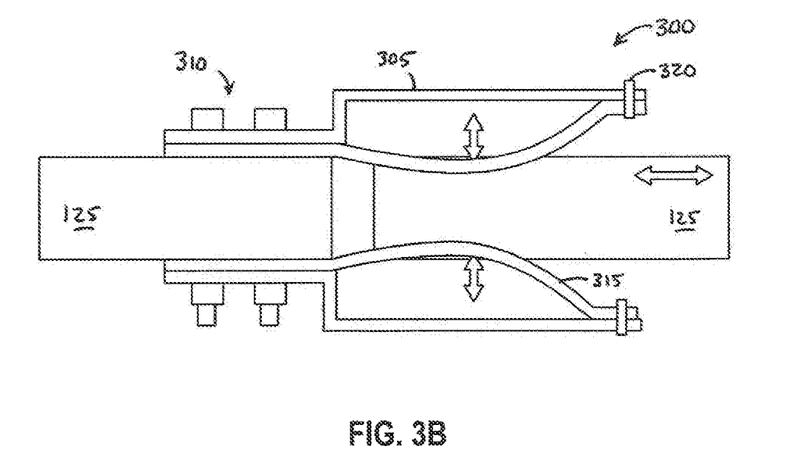
FIG. 3B is a schematic top view of an electrode spring of the version of the version of the weed electrocution system of FIG. 3A.
Figure 3C:
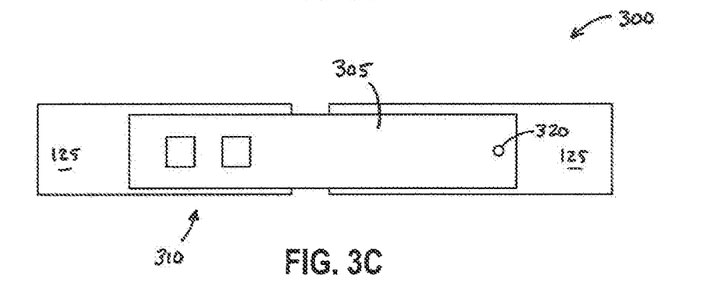
FIG. 3C is a schematic side view of the electrode spring of FIG. 3B.

As shown in FIG. 3A through 3C, an electrode connection spring 300 can be provided to join adjacent electrode bars 125 allowing power to flow from the electrode bar 125 associated with the central too bar 140 the electrode bars 125 associated with the peripheral tool bars 180. In this manner, power need only be delivered to one of the electrode bars 125, such as the electrode bar 125 of the central tool bar 140. Along with the hinge mechanism 185, the electrode connection springs 300 between adjacent electrode bars 125 allow for the peripheral tool bars 180 and their associated electrode bars 125 to pivot vertically and conform to the changing terrain as the weed electrocution system 100 travels across the crop field.

As shown in FIGS. 3B and 3C, the electrode connection spring 300 is made up of a housing 305 connected to one of the electrode bars 125. For example, the housing may be connected by bolts 310 or any alternative means, such as clamps, welds, rivets, adhesive, or the like. Within the housing 305 is one or more, preferably two or more, springs 315 that are biased inwardly and shaped to clampingly engage the other electrode bar 125. The end of the spring may be connected to the housing by a rivet 320 or the like. The springs 315 and the housing 305 are made of conductive material and thereby pass current from one electrode bar 125 to the other when the spring 125 is in contact with the second electrode bar 125. The compression of the springs 315 onto the electrode bar 125 is sufficiently loose to allow the electrode bars 125 to move and/or tilt relative to one another and sufficiently strong to maintain electrical contact during such movement. In one particular version, the housing 305 and springs 315 are made of copper or copper alloy, like the electrode bars 125. In an exemplary version, the springs 315 are a ⅛ inch copper spring. In an alternative version, the springs can be replaced with a simple loose wire, such as a loose copper wire, that connects the ends of adjacent electrode bars 125 while allowing relative movement and tilting of the electrode bars.

Figure 4A:
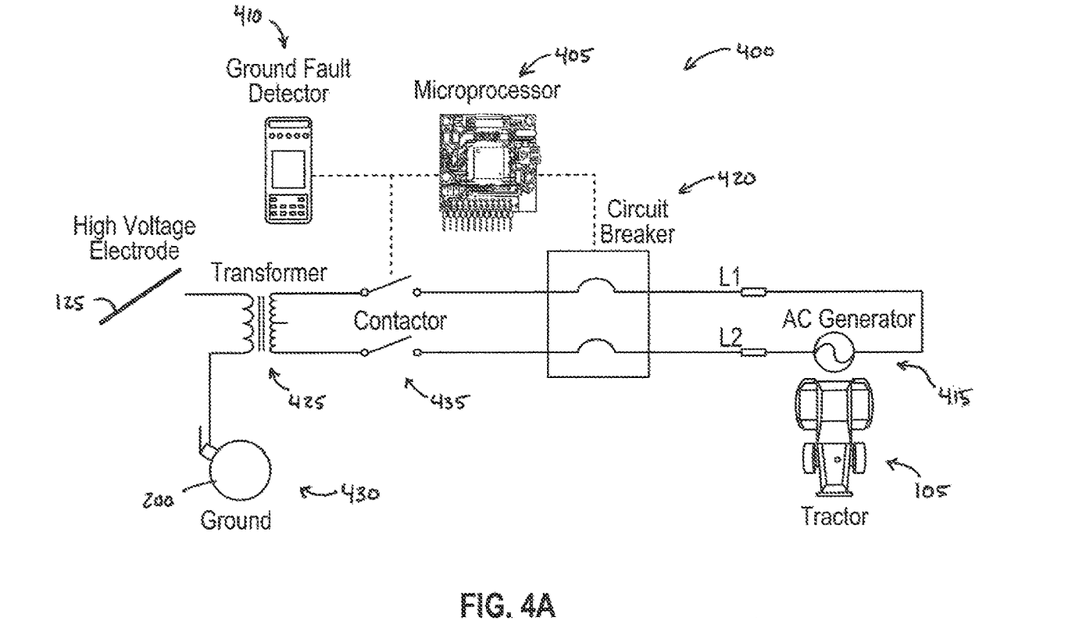
FIG. 4A is a schematic electrical diagram of a version of an electrical system of the weed electrocution system of the invention.

The weed electrocution system 100 may additionally include an electrical system to control and manage the distribution of the voltage throughout the system, an example of which is shown in FIG. 4A. It is desirable to properly ground the system to prevent arching of the voltage while the weed electrocution system 100 is in operation. Additional safety features may also be provided to reduce the risk to the operator of the tractor 105 or other individual working with high voltage equipment. Electrical interlocks can be used for protection of the operator of the vehicle and other individuals that may be near the electrode assembly.

As shown in FIG. 4A, the electrical system 400 comprises a processor 405, such as a microprocessor including a CPU and a memory, a ground fault detector 410, a current generator 415, a circuit breaker 420, a transformer 425, such as a step-up transformer, and a grounding member 430 which may in one version be the ground wheel 200. The ground fault detector 410 can be communicatively coupled to a contactor 435 that is in sequence between the current generator 415 and the transformer 425. The processor 405 and ground fault detector 410 are in electrical communication with the contactor 435 and other electrical components. The transformer 425 is further communicatively coupled to one or more electrode bars 125 of the present invention as well as one or more ground wheels 200 used to ground 430 the electrical system. Alternatively, the wheels 175 of the tractor 105 can be used to ground the electrical system 400. Interlocks can be automated or manually controlled by a user.

Additionally, one or more sensors can be in communication with the processor 405 to help control and monitor the system. The sensors can be located at various locations around the front, side, and rear of the tractor 105 and/or other parts of the weed electrocution system 100. The sensors can, for example, be any suitable sensor to detect the presence of an individual that is in the path of an electrode. In one exemplary embodiment, the sensors can be thermal sensors used to detect and distinguish an individual from the ambient environment. The processor 405 can be used to determine when an individual or animal is approaching the electrode assembly and initiate an interlock to prevent the current to continue to flow to the electrode(s) of the electrodes. Similarly, an interlock can be coupled to a sensor on a seat that is located on the vehicle. If the operator stands up from the seat the interlock will cut off the power to the electrode and/or the vehicle. Similarly, a "kill" switch can be manually operated by a user to quickly deactivate the current from flowing to the electrode. Among other manually operated switches, the microprocessor can initiate the opening of an interlock to prevent the current from reaching the electrode. Certain vehicle and sensor parameters can be stored on the memory. When a threshold is reached the microprocessor can trigger the interlock. These thresholds and parameters can be based on data acquired from a sensor or other information transmitted to the processor 405, such as thermal readings, temperatures, GPS coordinates, speed of the vehicle, pitch of the vehicle, and the like.

Figure 4B:
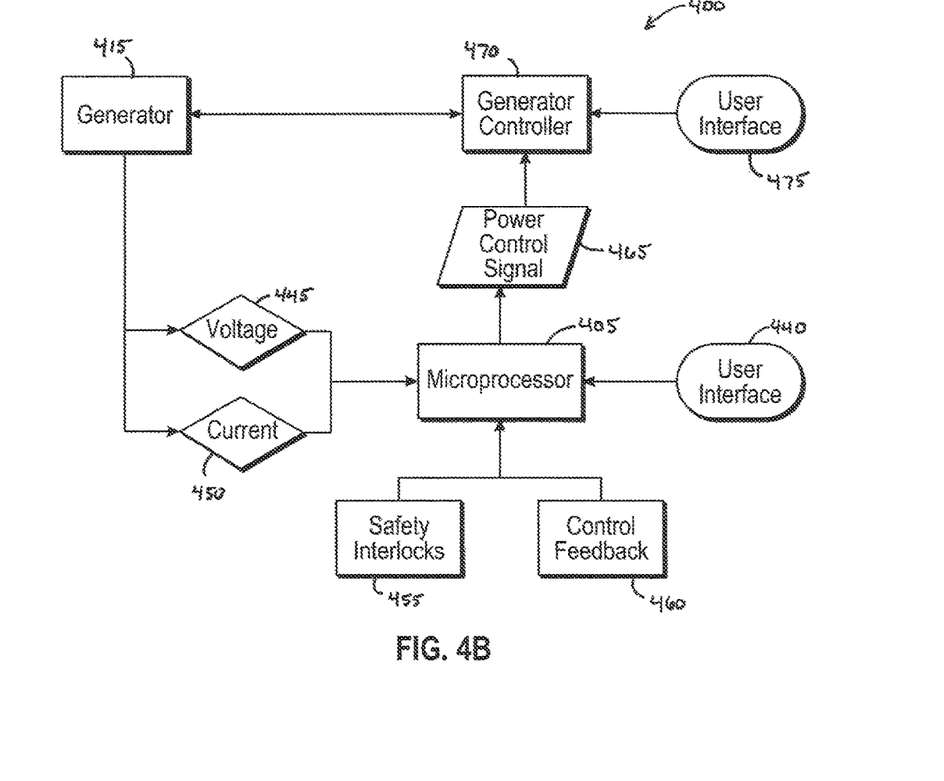
FIG. 4B is a schematic block diagram of an electrical system of the weed electrocution system of the invention.

The electrical system 400 can have additional elements further integrated into the system to provide automation and/or feedback to a user. As shown in FIG. 4B, the electrical system 400 can further comprise a user interface 440 communicatively coupled to the processor 405. The user interface 440 can provide visual feedback of any sensor related information and when or if an interlock is triggered. The user interface 440 can also display real-time voltage readings of the electrode or electrodes while in operation. The processor 405 is responsive to the user interface 440, signals related to the voltage 445 and current 450, and signals related to safety interlocks 455 and control feedback 460 to generate a power control signal 465 that controls a generator controller 470. The system 400 can comprise a separate generator controller user interface 475 that can be dedicated or redundant to provide additional reliability and safety.

Figure 5A:
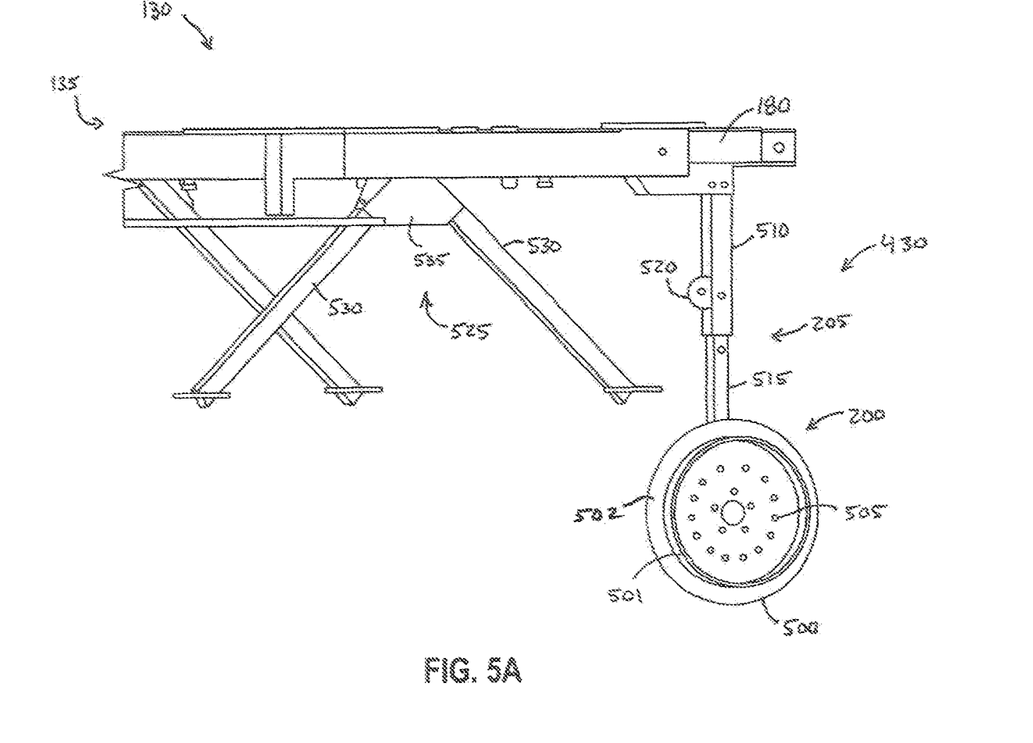
FIG. 5A is a schematic perspective view of a ground wheel of the weed electrocution system.

The grounding member 430 according to one version of electrical system 400 is shown in FIG. 5A. In this version, the ground wheel 200 makes up at least part of the grounding member 430. The ground wheel 200 may be a gauge or coulter wheel 500 made of a conductive material, such as one or more of an electrical conducting metal. As a gauge wheel the gauge or coulter wheel 500 can be any wheel that can assist on maintaining a constant height for the tool bar section 135. As a coulter wheel the gauge or coulter wheel 500 can slice into the ground in a vertical fashion as a coulter wheel does on a moldboard plow, planter, disc, or other such implement. In this regard, the gauge or coulter wheel 500 may also have a transversely extending ring 501 that helps control the depth that the outer portion 502 of the wheel be inserted into the ground. The gauge or coulter wheel 500 may also have openings 505 that can serve as motion sensor openings. With the precise motion speeds that can be accomplished, the system can be operated at speeds as low as 1 MPH. where one or more sensors can be attached. Examples of the types of sensors that may be used are hall effect, photo-electric, reed, and the like.

A version of the wheel connecting bar 205 is also shown in FIG. 5A. In this version, the length of the wheel connecting bar 215 is adjustable to help assure that the ground wheel 200 remains in contact with the ground. The wheel connecting bar 215 in this version includes an outer bar 510 and an inner bar 515 that telescopes within the outer bar 510. A locking member 520, such as a cotter pin that is insertable into one of a plurality of holes locks the bars at the desired length. The adjustability of the wheel assembly may be accomplished by any suitable means such as an interference fit, an adjustable set screw, spring detents, or the like. In another version, one or more springs can be provided that bias the ground wheel 200 downward to further insure contact with the ground.

As also shown in FIG. 5A, one or more stands 525 can be provided on the tool bar section 135 that support the weed electrocution system 100 when not in use. The stands 525 can include one or more legs 530 that are pivotally connected to a base 535 that is attached to a tool bar 140, 180. When the weed electrocution system 100 is to be used, the legs 530 can be swung upwardly and out of the way. Alternatively, unattached stands can be carried by the tractor 105 and used to support the tool bars when not in use. In addition, the hinge mechanism 185 connecting the central tool bar 140 to the peripheral tool bars 180 can allow the peripheral tool bars 180 to rotate upwardly to an upright position and be locked therein. This allows the weed electrocution system 100 to be transported when not in use with a smaller width dimension.

Figure 5B:
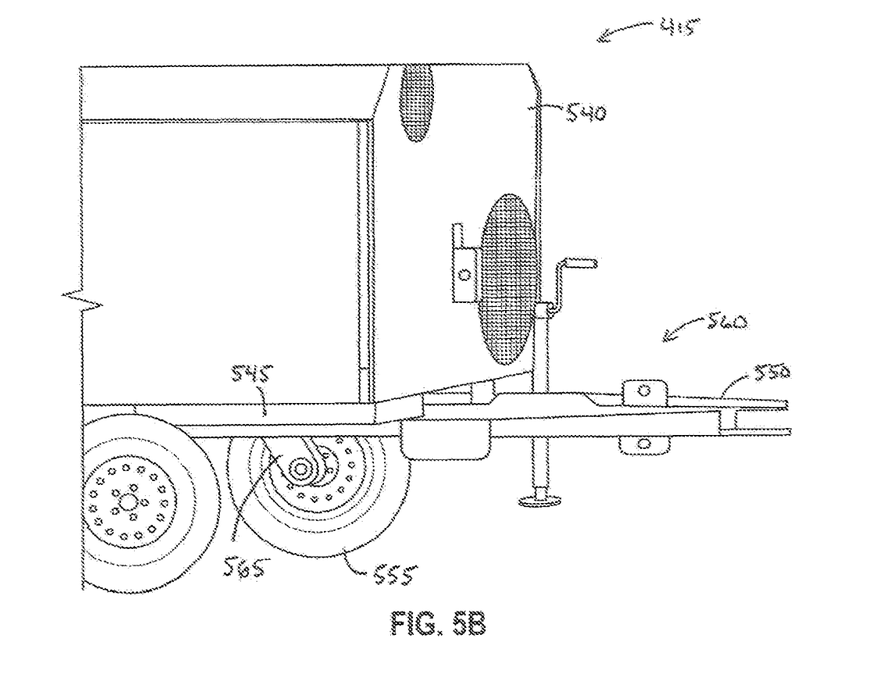
FIG. 5B is a schematic perspective view of a tow package for use with the weed electrocution system of the invention.

The tractor 105 can house or carry the current or power generator 415 capable of producing an electrical current that can be coupled to and move with the tractor 105. The power generator 415 can be configured to provide a high voltage energy source. The tractor 105 can have a drive motor and/or a separate generator or motor to create the high voltage electricity source. The power generator 415 delivers an electrical current to one or more electrode bars 125 by appropriately sized electrical conductors and terminals. In one version, as shown in FIG. 5B, the power generator 415 may be towed on the rear 115 of the tractor 105. The power generator 415 may be contained within a generator housing 540 that is carried on a trailer frame 545 that includes a trailer hitch 550 that can connect to the rear of the tractor 105 in conventional manner. The generator housing 540 can be made of heavy gauge sheet metal with hinged access panels for ease of access to the components inside. The trailer frame 545 include two or more wheels 555 to allow the trailer frame 545 to be pulled behind the tractor 105 as the tractor moves. In addition, the hitch portion 560 may be rotated upwardly to allow the trailer frame to be attached to the rear of the tractor 105 in a 3-point mounting device manner, and the wheels 555 may be provided on rotatable axes 565 that allow the wheels 555 to be lifted from the ground and locked into a down or up position. Thus, in this configuration, the power generator 415 can be towed behind the tractor 105 without the wheels 555 contacting the ground and potentially damaging the crops. The electricity from the power generator 415 is coupled to the step-up transformer 425 and then connects to the electrodes 120 via appropriately sized electrical conductor cables housed in a protective nylon sleeve or jacket. The cables connect with specific terminal ends or plugs in the electrode bar 125. The power generator 415 can generate power from a conventional gear box or from a series of pulleys and belts. The power generator 415 and housing 540 also can include multiple generator protection devices, such as regulators, relays, shunt trip breaker, and the like.

The components of the weed electrocution system 100 may be made of any materials suitable for carrying out their purposes. For example, the tool bars 140, 180 may comprise high strength square or rectangular tubing rated for the load requirements of the devices connected to it. The electrode holding arms 160 may comprise one or more high strength materials, such as square or rectangle steel tubing or square or rectangular fiberglass tubing filled with closed cell foam insulating material. In one version, the electrode holding arms 160 comprise tubing or hollow bar made of fiberglass and polyethylene and filled with closed cell foam insulating material. The combined use of a fiberglass electrode holding arm 160 and an insulator 165 reduces the likelihood of "water wicking" where electrical current travels up the arms when there is a heavy amount of moisture present. The electrode bars 125 may comprise one or more electrically conductive materials, such as copper or a copper alloy. The insulator 165 may comprise one or more non-current-conducting, high-impact plastic or the like.

Alternative power generator 415 systems may also be used with the weed electrocution system 100. For example, the system may include the power generators, power delivery mechanisms, and/or control mechanisms described in one or more of U.S. Pat. Nos. 3,919,806; 4,094,095; 4,428,150; U.S. Patent Application 2006/0265946; and PCT Application WO 2016/016627, all of which are incorporated herein by reference in their entireties.

The sizes and dimensions of the components of the weed electrocution system 100 will depend in part on the materials being used. In an exemplary version, the tool bars 140, 180 can be from about 5 feet to about 15 feet, each, in length and from about 2 inches to 10 inches, more preferably from about 3 inches to about 6 inches in width and can have any cross-sectional shape, such as square, rectangular, triangular, polygonal, round, circular, oval, ovoid, or the like. The electrode bars 125 can be from about 5 feet to about 16 feet, each, in length, and from about 0.5 to about 5 inches, more preferably from about 1 inch to about 3 inches in width and can have any cross-sectional shape, such as square, rectangular, triangular, polygonal, round, circular, oval, ovoid, or the like.

While the weed electrocution system 100 has been described above as having one or three tool bars, other variations are possible. For example, in one version, the tool bar section 135 may be made of two tool bars that pivot relative to one another. In another version, there may be additional peripheral tool bars that are attached to the ends of the peripheral tool bars 180 to make five tool bars in total. Each of the four peripheral tool bars can be equipped with a ground wheel and can be able to tilt relative to one another.

While the weed electrocution system 100 has been described above as having a tool bar section 135 that is generally parallel to the electrode bars 125, other configurations are possible. For example, either or both of the tool bar sections 135 and the electrode bars 125 can be angled forwardly or rearwardly relative to one another. In another version, the tool bar section 135 and the electrode bars 125 can be parallel to one another but angled relative to the direction of travel of the tractor 105.

While the weed electrocution system 100 has been described above as having a tool bar section 135 having a first tool bar 140 that is pivotally connected to a second tool bar 180, other configurations are possible. For example, the hinge mechanism 185 can be replaced with a sliding mechanism that allows the tool bars to slide up and down relative to one another to adjust their respective heights. In another version, the tool bars can be free from one another and each separately mounted to the tractor 105. In this version, the mount for the peripheral tool bar 180 can allow the peripheral tool bar 180 to move up and down in response to the contour of the land and the ground wheel 200.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

What is claimed is:

1. A weed electrocution system comprising:
a transport assembly comprising a first tool bar and a second tool bar, the second tool bar being pivotably connected to the first tool bar;
a conductive ground wheel connected to the second tool bar, the conductive ground wheel being adapted to contact land on which weeds are present;
a mount adapted to mount the transport assembly to a tractor;
a first electrode associated with the first tool bar; and
a second electrode associated with the second tool bar,
wherein when an electric current is supplied to the first and second electrodes, the electrodes are able to electrocute weeds that come in contact with the electrodes, wherein the conductive ground wheel causes the second tool bar to pivot relative to the first tool bar to adjust the second electrode to the contour of the land, and wherein the conductive ground wheel is made of electrically conductive material and serves as an electrical ground.

2. The weed electrocution system according to claim 1 wherein the first tool bar extends horizontally when the tractor is on flat land and wherein the second tool bar is pivotally connected to the first tool bar so that it pivots relative to the horizontal.

3. The weed electrocution system according to claim 1 wherein the mount is adapted to mount the transport assembly to the front of the tractor so that it extends transverse to the direction of travel of the tractor, wherein the first tool bar includes an electrode holding arm that supports the first electrode, and wherein the first electrode is in the form of an electrode bar that extends transverse to the direction of travel of the tractor.

4. The weed electrocution system according to claim 3 wherein the first tool bar and the first electrode are generally parallel.

5. The weed electrocution system according to claim 3 wherein the first electrode is connected to the electrode holding arm by an electrical insulator.

6. The weed electrocution system according to claim 3 wherein the electrode holding arm comprises an electrical insulator.

7. The weed electrocution system according to claim 1 wherein the transport assembly comprises a third tool bar pivotably connected to the first tool bar at an end of the first tool bar that is opposite to an end of the first tool bar where the second tool bar is pivotally connected, wherein the first tool bar is a central tool bar and the second and third tool bars are peripherally positioned relative to the central tool bar.

8. The weed electrocution system according to claim 1 wherein the first tool bar includes an electrode holding arm that supports the first electrode, wherein the first electrode is in the form of a first electrode bar, wherein the second tool bar includes an electrode holding arm that supports the second electrode, wherein the second electrode is in the form of a second electrode bar, and wherein the first electrode bar is electrically connected to the second electrode bar.

9. The weed electrocution system according to claim 8 wherein the first electrode bar is electrically connected to the second electrode bar by a connection spring that allows the first electrode bar to move relative to the second electrode bar while maintaining an electrical connection.

10. The weed electrocution system according to claim 1 wherein the mount is adapted to mount the transport assembly to the front of a tractor and is able to adjust the height of the electrodes relative to the ground.

11. The weed electrocution system according to claim 1 wherein the conductive ground wheel is a coulter wheel with a transversely extending depth ring.

12. The weed electrocution system according to claim 1 wherein the conductive ground wheel is equipped with one or more sensors.

13. The weed electrocution system according to claim 1 wherein the mount is adapted to mount the transport assembly to the front of the tractor and further comprising a towable power generator adapted to be mounted to the rear of the tractor by a three-point mounting system.

14. A weed electrocution system according to claim 1 wherein the second tool bar has an inner end and an outer end, wherein the second tool bar is pivotally connected to the first tool bar at the second tool bar inner end, and wherein the conductive ground wheel is connected to the second tool bar at the second tool bar outer end.

15. A weed electrocution system comprising:
a tool bar having a first end and a second end;
a ground wheel connected to the first end or second end of the tool bar;
a mount adapted to mount the tool bar to a tractor so that at least a portion of the tool bar extends horizontally when the tractor is on flat land;
an electrode bar;
an electrode holding arm connecting the tool bar to the electrode bar, the electrode holding arm comprising electrically insulating material; and
an electrical insulator connecting the electrode bar to the electrode holding arm,
wherein when an electric current is supplied to the electrode bar, the electrode bar is able to electrocute weeds that come in contact with the electrode bar, wherein the electrical insulator and the electrode holding arm prevent current from passing from the electrode bar to the tool bar, wherein the electrode holding arm comprises a hollow bar filled with foam, and wherein the electrical insulator is a non-conductive member attached to the electrode holding arm and having a passageway that receives the electrode bar.

16. The weed electrocution system according to claim 15 wherein the hollow bar comprises fiberglass and polyethylene, and wherein the electrical insulator is a plastic member.

17. The weed electrocution system according to claim 15 further comprising a second electrode holding arm connected to the tool bar and a second electrical insulator connecting the electrode bar to the second electrode holding arm.

18. The weed electrocution system according to claim 15 wherein the tool bar includes multiple sections that are pivotable relative to one another and relative to the horizontal.

19. The weed electrocution system according to claim 15 wherein the tool bar comprises a central tool bar, a first peripheral tool bar that includes the first end, and a second peripheral tool bar that includes the second end, wherein the first peripheral tool bar and the second peripheral tool bar are pivotal relative to the central tool bar and relative to the horizontal, wherein the ground wheel is attached to the first peripheral tool bar, and wherein a second ground wheel is attached to the second peripheral tool bar.

20. A method of electrocuting weeds, the method comprising:
- mounting a transport assembly to the front of a tractor, the transport assembly comprising a first tool bar and a second tool bar, the second tool bar having an inner end and an outer end, the second tool bar being pivotal relative to the first tool bar;
- supporting the second tool bar by a conductive ground wheel connected to the second tool bar outer end, the conductive ground wheel adapted to contact land on which weeds are present;
- supplying electrical current to a first electrode associated with the first tool bar and to a second electrode associated with the second tool bar;
- driving the tractor through a crop field and contacting weeds with the first and second electrodes to electrocute the weeds,
- wherein the conductive ground wheel causes the second tool bar to pivot relative to the first tool bar about an axis parallel to the forward direction of the tractor to adjust the second electrode to the contour of the land in the crop field.

* * * * *